United States Patent
Bradley et al.

(10) Patent No.: US 6,852,409 B2
(45) Date of Patent: Feb. 8, 2005

(54) RADIATION-CURED CORRECTION TAPE

(75) Inventors: Creg G. Bradley, Simpsonville, SC (US); Peter D. Gabriele, York, PA (US); Teresa B. Hopper, Belton, SC (US); Michael T. Nowak, Simpsonville, SC (US)

(73) Assignee: BIC Corporation, Milford, CT (US)

( * ) Notice: Subject to any disclaimer, the term of this patent is extended or adjusted under 35 U.S.C. 154(b) by 0 days.

(21) Appl. No.: 10/071,497

(22) Filed: Feb. 8, 2002

(65) Prior Publication Data

US 2003/0152730 A1 Aug. 14, 2003

(51) Int. Cl.$^7$ .................................. C09J 7/02
(52) U.S. Cl. ..................... 428/354; 428/343; 428/40.1; 428/41.3; 428/41.6; 428/41.7; 428/41.8; 400/237; 400/240.1; 400/697
(58) Field of Search ................ 428/354, 343, 428/40.1, 41.3, 41.6, 41.7, 41.8; 400/237, 240.1, 697

(56) References Cited

U.S. PATENT DOCUMENTS

| | | |
|---|---|---|
| 4,388,137 A | 6/1983 | McCarty et al. |
| 4,434,207 A | 2/1984 | Franey |
| 4,891,260 A | 1/1990 | Kunkel et al. |
| 5,194,455 A | 3/1993 | Massow et al. |
| 5,221,577 A | 6/1993 | Inaba et al. |
| 5,700,552 A | 12/1997 | Katsuro et al. |
| 5,714,221 A * | 2/1998 | Sugibuchi .................. 428/40.1 |
| 5,997,994 A | 12/1999 | Matsushima |
| 6,162,492 A | 12/2000 | Narayanan |
| 6,235,364 B1 | 5/2001 | Katsuro et al. |
| 6,352,770 B1 * | 3/2002 | Nienaber et al. ........... 428/354 |
| 6,500,509 B1 * | 12/2002 | Katsuro et al. ............ 428/40.1 |

* cited by examiner

*Primary Examiner*—Daniel Zirker
(74) *Attorney, Agent, or Firm*—Jones Day

(57) ABSTRACT

A multilayer pressure sensitive correction tape useful for masking handwritten and/or printed characters comprising a release liner, a masking layer and a pressure sensitive adhesive layer, wherein at least one of the layers is cured by radiation. In a preferred embodiment of the invention, the masking layer and pressure sensitive adhesive layer comprise formulations of reactive monomers or oligomers which are radiation-cured after the formulations are applied to the correction tape assembly. In a more preferred embodiment of the invention the masking layer and pressure sensitive adhesive layer formulations contain no volatile solvents when these formulations are applied to the correction tape assembly. The radiation-cured layers are essentially insoluble in organic solvents and water, and the radiation-cured layers exhibit improved film toughness and improved resistance to ink "bleed through". Additionally, the present invention is directed to a process for making such a multilayer correction tape having at least one radiation cured layer.

47 Claims, 1 Drawing Sheet

RADIATION-CURED CORRECTION TAPE

FIELD OF INVENTION

The present invention is directed to a multilayer pressure sensitive correction tape comprising a release liner, a masking layer and a pressure sensitive adhesive layer and the process for making such a multilayer correction tape. Preferably the pressure sensitive adhesive layer or masking layer has been cured by radiation. Tapes in accordance with the present invention are useful for masking handwritten and/or printed characters.

BACKGROUND OF INVENTION

Multilayer pressure sensitive correction tapes are known. Such tapes are disclosed in U.S. Pat. Nos. 4,891,260 to Kunkel et al.; U.S. Pat. No. 5,221,577 to Inaba et al.; U.S. Pat. No. 5,700,552 to Katsuro et al.; U.S. Pat. No. 5,997,994 to Matsushima; U.S. Pat. No. 6,162,492 to Narayanan; and U.S. Pat. No. 6,235,364 to Katsuro et al. These multilayer flexible pressure sensitive correction tapes consist of a flexible carrier strip, a masking (cover) layer on the carrier strip, and an adhesive layer on the masking layer. The processes for preparing multilayer pressure sensitive correction tape have several features in common. The masking layer and pressure sensitive adhesive layer formulations contain pre-formed polymers when the formulations are applied to the correction tape assembly. Second, the formulations contain volatile solvents, typically organic solvents, and the formulations are applied as either solutions or dispersions. Third, the layers are developed by allowing the solvents to evaporate. One disadvantage of these solvent-based processes is that an initially applied layer will be susceptible to resolubilization when the second layer is applied to it. This could adversely affect the overall properties of the multilayer pressure sensitive correction tape.

A method of avoiding this problem is disclosed in U.S. Pat. No. 4,891,260 to Kunkel et al. U.S. Pat. No. 4,891,260 discloses a masking layer formulation containing a resin dissolved in an organic solvent. The masking layer is applied to the tape, and the solvent is removed by evaporation. The adhesive layer is then applied as an aqueous dispersion. This approach minimizes resolubilization of the underlying masking layer. However, the use of organic solvents on an industrial scale is not desirable. Such solvents are sources of pollution, so they are subject to environmental regulations. Measures taken to decrease the environmental impact of organic solvents increase production costs of correction tapes. Therefore there is an incentive to prepare correction tapes with reduced levels of organic solvents.

A multilayer pressure sensitive correction tape prepared with only aqueous solvents is disclosed in U.S. Pat. No. 6,162,492 to Narayanan. There both the adhesive and masking layers are applied as aqueous solutions or suspensions. However, the aqueous process disclosed in U.S. Pat. No. 6,162,492 may require the use of pH balancers, and the process still requires two evaporation steps. Such requirements add to the cost and complexity of the process.

In preparing pressure sensitive correction tapes by conventional solvent-based coating processes, the formulations for the layers are applied to the correction tape followed by evaporation. During this drying process the thickness of the applied film can decrease by a factor of about two. This makes it difficult to prepare a layer with a desired thickness.

A more desirable process for preparing a multilayer pressure sensitive a correction tape would use no solvent. Solvent-free processes for applying coating layers to substrates are known. U.S. Pat. No. 4,388,137 to McCarty et al. discloses a process for using radiation to facilitate the transfer of a coating vehicle to a substrate. The coating vehicle composition is first applied to a web carrier, and the coating composition is contacted with a porous substrate. The resulting "sandwich" (carrying web/uncured coating/substrate) is irradiated. The carrying web is peeled away, and the cured coating remains attached to the porous substrate. However, there is no disclosure that the radiation cured coating can function as a pressure sensitive adhesive.

U.S. Pat. No. 4,434,207 to Francy discloses a process for forming a highly cross-linked adhesive supported on a thin flexible substrate. The adhesive formulation is applied-directly to a tape without solvent, and is cured with radiation. However, the correction tape contains no covering layer or opaque blocking agents. Instead, the invention is used as a "lift-off" correction medium to remove ink from paper.

A slightly different process for preparing a pressure sensitive adhesive is disclosed in U.S. Pat. No. 5,194,455 to Massow et al. There a preformed, heat-flowable polymer formulation is melt-coated onto a tape. The coating is then irradiated with high energy radiation to form a pressure sensitive adhesive that is useful for industrial or medical adhesive tapes. However, there is no disclosure that the invention can additionally contain a masking layer between the pressure sensitive adhesive layer and the tape.

There is a need for a multilayer pressure sensitive correction tape which exhibits improved film toughness, improved resistance to ink "bleed through", infusibility, and essentially no solubility in organic solvents or water.

SUMMARY OF THE INVENTION

The present invention is directed to a multilayer flexible pressure sensitive correction tape containing a release liner, a masking layer on the release liner and a pressure sensitive adhesive layer on the masking layer. In the present invention, the release liner is not considered a "layer". The masking layer formulation and adhesive layer formulation are applied to the correction tape assembly in the form of clear liquids, dispersions, pastes or hot melts. At least one of the applied layers is cured with radiation. The radiation-cured layers exhibit improved film toughness, improved resistance to ink "bleed through", infusibility, and essentially no solubility in organic solvents or water.

The invention is directed to a multilayer pressure sensitive correction tape containing a release liner, a masking layer on the release liner and a pressure sensitive adhesive layer on the masking layer, and at least one of the layers is cured with radiation. The invention provides several advantages over the current correction tape technology. Some advantages are the reduction of emissions from organic solvents, the use of less energy in the process of the invention, a smoother and tougher film product, better ink "bleed through" properties, and increased resistance to resolubilization in organic solvents and water.

One object of the invention is to use radiation curing to prepare a multilayer pressure sensitive correction tape with improved film toughness, improved resistance to ink "bleed through", and essentially no solubility in organic solvents or water.

Another object of the invention is to use radiation curing to prepare a multilayer pressure sensitive correction tape with reduced emissions of volatile components.

Another object of the invention is to provide a process for manufacturing a multilayer pressure sensitive correction tape in which one or more of the formulations is cured by radiation, and in which the emission of volatile components is reduced compared to conventional solvent-based correction tape technology.

Another object of the invention is to use radiation curing to prepare a multilayer pressure sensitive correction tape in which the thickness of the applied layers does not change during the curing process.

The multilayer pressure sensitive correction tape in the present invention comprises a release liner, a masking (opacifying) layer on the release liner, and a pressure sensitive adhesive layer on the masking layer. The release liner is typically paper, thermoplastic film, or metallic foil. The release liner serves as a "backing" to the subsequent layer. The release liner is typically coated with a release agent to facilitate removal of the correction medium during application to a substrate. The masking layer comprises an organic polymer and a blocking material such as an opaque pigment. The organic polymer binds the components of the masking layer. The masking layer is weakly bonded to the release liner. The pressure sensitive adhesive layer comprises an organic polymer. The adhesive properties of the pressure sensitive adhesive layer enable it to bond strongly both to the masking layer and to the substrate. When the pressure sensitive correction tape is applied to a substrate, the adhesive layer is affixed to the substrate. The masking layer is then transferred with the adhesive layer from the release liner to the substrate. In the present invention at least one of the layers is cured by radiation after the layer is applied to the correction tape assembly. Such radiation curing produces an infusible (non-meltable) three-dimensional cross-linked polymer network. The radiation-cured layers are essentially insoluble in organic solvents and water, and the cured layers exhibit improved film toughness and improved resistance to ink "bleed through".

DETAILED DESCRIPTION OF THE INVENTION

Figure 1:
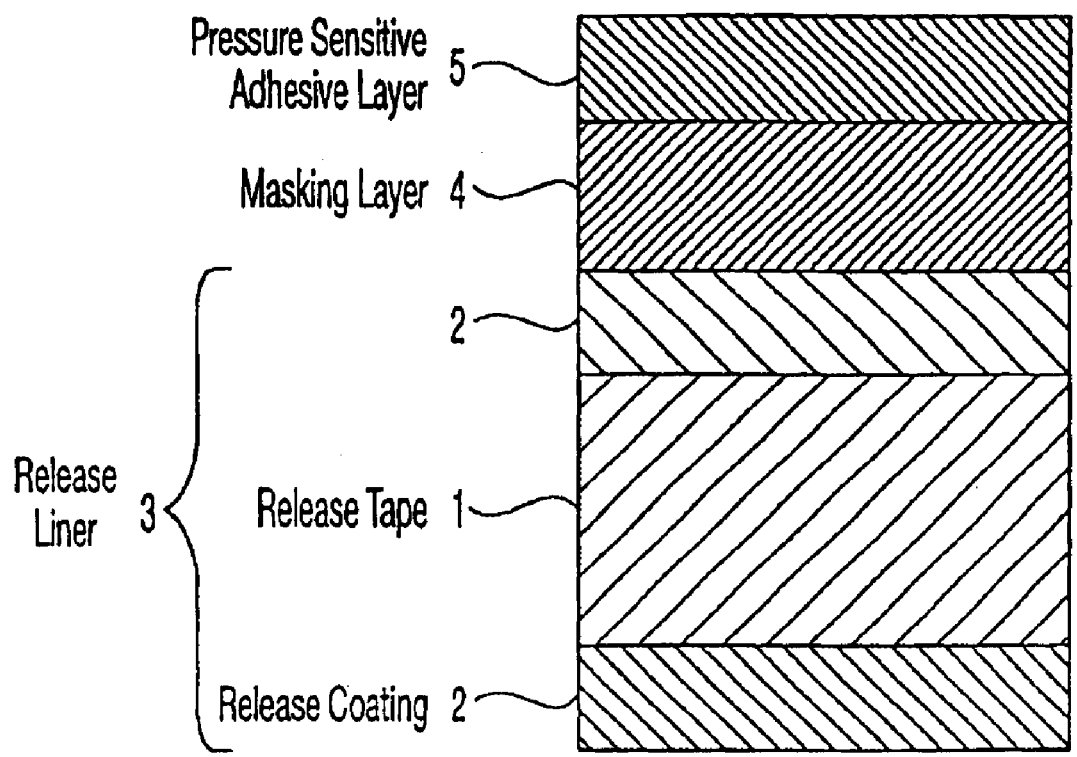
FIG. 1 is a cross-sectional view of a multilayer pressure sensitive correction tape according to the present invention.

As used herein, the term "bleed inhibitor" means a compound or mixture of compounds which is used to prevent ink migration and to prevent smearing of inks written over the correction medium layer.

As used herein, the term "blocking material" refers to a material that is used to hide or conceal the covered subject matter.

As used herein, the term "correction tape assembly" refers to the pressure sensitive correction assembly in any of its preparation steps.

As used herein, the term "formulation" refers to the composition of the masking layer or the adhesive layer at the time the compositions are applied to the correction tape assembly. The formulations can be, but are not limited to, clear liquids, dispersions, pastes or hot melts.

As used herein, the term "hot-melt" refers to a formulation that is in a molten state as a result of applying heat to the formulation.

As used herein, the term "layer" refers to either the masking layer or the pressure sensitive adhesive layer.

As used herein, the term "masking layer" refers to the layer of the multilayer pressure sensitive correction tape assembly that is located between the release liner coating and the pressure sensitive adhesive layer. The masking layer is designated as 4 in FIG. 1. The masking layer contains a blocking material such as an opaque pigment and an organic polymer that serves as a binding agent.

As used herein, the term "organic polymer" means a chemical polymer comprising monomers containing mostly carbon, hydrogen and, if desired, oxygen, nitrogen, sulfur, halides, or mixtures thereof.

As used herein, the term "photoinitiator" means a compound which forms free-radicals upon impingement by certain frequencies of light.

As used herein, the term "pressure sensitive adhesive layer" refers to the layer of the pressure sensitive correction tape that is on top of the masking layer. The pressure sensitive adhesive layer is designated as 5 in FIG. 1. The pressure sensitive adhesive layer comprises an organic polymer that can function as both a pressure sensitive adhesive layer and as a binding agent. The pressure sensitive adhesive layer can optionally contain an opaque pigment. The masking layer and pressure sensitive adhesive layer can optionally contain other components such as tackifiers, stabilizers, inhibitors, filler pigments, flow control agents, surfactants or wetting agents, dispersing agents, or bleed inhibitors.

As used herein, the term "radiation curing" or "curing" means a process of using ionizing energy (radiation) to induce reactive monomers or oligomers to polymerize.

As used herein, the term "release liner" refers to the tape upon which the masking layer is applied. In the present invention the release liner is not one of the layers.

As used herein, the term "substrate" refers to the surface on which the U.V. correction tape is applied to mask, for example, handwritten or printed characters. A typical, but non-limiting, example of a substrate is writing paper.

As used herein, the term "volatile components" refers to components that are removed from the applied layer by evaporation during the deposition process.

The present invention is directed to a multilayer pressure sensitive correction tape containing a release liner, a masking layer on the release liner and a pressure sensitive adhesive layer on the masking layer. The masking layer formulation and adhesive layer formulation are applied to the correction tape assembly, and at least one of the layers is cured with radiation to form a radiation cured layer. The radiation-cured layers exhibit improved film toughness, smoothness, improved resistance to ink "bleed through", infusibility, and essentially no solubility in organic solvents or water.

FIG. 1 shows a cross sectional view of one embodiment of the pressure sensitive correction tape. The correction tape contains a transfer tape 1 which is coated with release coating 2. The coated transfer tape, hereinafter referred to as the transfer liner, is designated as 3 in FIG. 1. On top of the transfer liner is a masking layer 4, and on top of the masking layer 4 is a pressure sensitive adhesive layer 5.

In one embodiment of the invention a multilayer pressure sensitive correction tape comprises a release liner, a masking layer, and a pressure sensitive adhesive layer, wherein one of the layers is cured with radiation.

In another embodiment of the invention a multilayer pressure sensitive correction tape comprises a release liner, a radiation-cured masking layer and a radiation-cured pressure sensitive adhesive layer.

The masking layer and the pressure sensitive adhesive layers are applied to the correction tape assembly as pastes, dispersions, liquids, solutions or hot melts. The applied formulations can optionally contain an organic solvent or water. When applied to the correction tape assembly, the formulations can exhibit viscosities ranging from about 1 to about 1,000,000 cps, preferably from about 100 to about 500,000 cps, more preferably from about 100 to about 100,000 cps. The applied layers contain reactive monomers, reactive oligomers or polymers. The invention requires that at least one of the layers is cured by radiation.

The multilayer pressure sensitive correction tape contains a release linear which is designated as 3 in FIG. 1. The release liner consists of a release tape (designated as 1 in FIG. 1) and a release coating (designated as 2 in FIG. 1). Suitable release tapes are those that can be coiled into rolls and used in correction tape dispensers. Suitable correction tape dispensers include those disclosed in European Publication No. EP 727378 A1. Preferred materials for the release tape include paper, plastic films, such as polyester, polycarbonate, polyacrylic, polyolefin, polystyrene, etc., and metal foils such as aluminum, zinc, brass, etc. The release tape can be transparent, translucent or opaque.

The release tape is coated with a release coating agent, which is designated as 2 in FIG. 1. The release coating can be a polyolefin, polysiloxane, polyfluoroolefin, a silicone based material, a wax, or mixtures thereof. More preferably, the release coating is a high molecular weight polyolefin, i.e., a polyolefin with a $M_n$ of at least 20,000, a polysiloxane, a polytetrafluoroolefin, or a mixture thereof. The release coating should be present in sufficient amounts to lightly coat the support member and aid the release of the correction medium from the release liner onto the surface to be corrected. The release coating can form a layer of a thickness between about 0.1 microns ("$\mu$m") to about 25 $\mu$m. Preferably, the releasing coating layer should be between about 0.5 $\mu$m to about 15 $\mu$m, more preferably between about 5 $\mu$m to about 10 $\mu$m. The release liner can be transparent, translucent or opaque. A preferred release liner is one sold under the trade name 17150 L3 by Siltech, Miamisburg, Ohio and it is composed of a 1.5 mil polyester transparent release film with a silicone coating. When the release liner is transparent or translucent, the masking layer can optionally be cured by directing radiation to the uncoated side of the tape;

Organic polymers (also called oligomers) used in the invention include those polymers that are cured by ionizing radiation. Such curing produces cross-linked polymers in which separate polymer chains are joined by a chemical bond.

Oligomers or polymers suitable for radiation curing are those having free functional or reactive moieties such as vinyl, acrylate, methacrylate, vinyl ether, and epoxy. Such reactive oligomers or polymers can optionally contain more than one reactive group. An example of such an oligomer is CN 973H85 which is an aromatic urethane polymer with pendant acrylate functional groups. The use of monomers with more than one reactive group blended with such suitable oligomers produces a coating with a coatable viscosity plus a high degree of cross-linking. An example of a multi-functional monomer is ethoxylated (3) trimethylolpropane triacrylate made by Sartomer, Exton, Pa. and sold under ret the tradename SR 454.

As used in the present invention, "radiation curing" or "curing" means a process of using ionizing energy (radiation) to induce reactive monomers or oligomers to polymerize. The same term is used to define the process in which ionizing radiation is used to induce cross-linking between polymer chains. Without being bound by theory, it is believed that ionizing radiation generates free radicals which initiate the polymerization of the monomers and the cross-linking of polymer chains. Therefore, the ionizing radiation must be capable of initiating free radical polymerization or crosslinking. Suitable sources of ionizing radiation include electron beam, gamma rays, or ultraviolet ("U.V."). Preferred radiation sources are U.V. radiation (wavelength 200 to 400 nm) or high-energy electrons (2 to 10 megarads per dose). It is sometimes useful to include a photoinitiator in the formulations subject to curing.

Additionally, other non-reactive organic polymers may be used in the present invention by blending with the reactive oligomers and monomers. Such organic polymers typically include acrylate, methacrylate, styrene, styrene acrylic, styrene butadiene, vinyl acetate homopolymer, low volatile organic compound ("VOC") vinyl acetate, vinyl acetate ethylene copolymers, cellulose and mixtures thereof.

Preferably, these non-reactive organic polymers include acrylonitrile/butadiene/styrene resin, alginic acid sodium salt, butyl methacrylate/isobutyl methacrylate copolymer, cellulose acetate, cellulose acetate butyrate, cellulose propionate, cellulose triacetate, ethyl cellulose, ethylene/acrylic acid copolymer, ethylene/ethyl acrylate copolymer, ethylene/propylene copolymer, ethylene/vinyl acetate copolymer, hydroxybutyl methyl cellulose, hydroxypropyl cellulose, hydroxypropyl methyl cellulose, methyl cellulose, methyl vinyl ether/maleic acid copolymer, methyl vinyl ether/maleic anhydride, nylon, phenoxy resin, polyacetal, polyacrylamide, poly(acrylic acid), polyamide resin, 1,2-polybutadiene, poly(1-butene), poly(n-butyl methacrylate), polycaprolactone, polycarbonate resin, poly(diallyl isophthalate), poly(diallyl phthalate), poly(2,6-dimethyl-p-phenylene oxide), poly(4,4-dipropoxy-2,2-diphenyl propane fumarate), poly(ethyl methacrylate), polyethylene, polyethylene chlorinated, polyethylene chlorosulfonated, poly (ethylene oxide), poly(ethylene terephthalate), poly(2-hydroxyethyl methacrylate), poly(isobutyl methacrylate), polyisoprene, poly(methyl methacrylate), poly(4-methyl-1-pentene), poly(methylstyrene), poly((p-phenylene ethersulphone), poly(phenylene sulfide), polypropylene, polystyrene, polysulfone resin, poly(tetrafluoroethylene), poly(2,4,6-tribromostyrene), poly(vinyl acetate), poly(vinyl alcohol), poly(vinyl butyral), poly(vinyl chloride), poly (vinyl formal), poly(vinyl pyrrolidone), poly(vinyl stearate), poly(vinylidene fluoride), styrene/acrylonitrile copolymer, styrene/allyl alcohol copolymer, styrene/butadiene copolymer, styrene/butyl methacrylate copolymer, styrene/ethylene/butylene copolymer, styrene/isoprene copolymer, styrene/maleic anhydride copolymer, vinyl alcohol/vinyl butyral copolymer, vinyl chloride/vinyl acetate copolymer, vinyl chloride/vinyl acetate/hydroxypropyl acrylate, vinyl chloride/vinyl acetate/vinyl alcohol, vinylidene chloride/acrylonitrile copolymer, vinylidene chloride/vinyl chloride copolymer, N-vinyl pyrrolidone/vinyl acetate copolymer, zein, poly(ethyl acrylate), poly(isopropyl acrylate), poly(n-butyl acrylate), poly(isobutyl acrylate), poly(hexyl acrylate), poly(decyl acrylate), poly(lauryl acrylate), poly(hexyl methacrylate), poly(cyclohexyl methacrylate), poly(lauryl methacrylate), poly(p-t-butylstyrene), polystyrene sulfonate, poly(vinylbenzyl chloride), poly(vinyl toluene), and mixtures thereof. More preferably, the organic polymer includes polymers and copolymers of ethylene, vinyl acetate, ethylene vinyl acetate. Examples of commercially available organic polymers are ELVACE 733, ELVACE 735, ELVACE 40722, and ELVACE 97955 manufactured by Reichhold Chemical Co., 2400 Ellis Road, Durham, N.C. 27703-5543.

Photoinitiators are compounds which form free-radicals upon impingement by certain frequencies of light. Examples of suitable photoinitiators include, but are not limited to, benzoin alkyl ethers, benzophenone, benzildimethyl ketal (made by Ciba Specialty Chemicals, Tarrytown, N.Y. under the trade name IRGACURE 651) or a blend of 2,4,6-trimethylbenzoyldiphenylphosphine oxide, alpha-hydroxy ketone and a benzophenone derivative (made by Sartomer, Exton, Pa. under the trade name ESACURE KTO46).

The masking layer, and optionally the pressure sensitive adhesive layer, further comprises opaque pigments. As used herein, "opaque pigment" refers to a pigment which is nontranslucent and nontransparent. The opaque pigment is typically an inorganic pigment, and the pigment is chosen to match the background color of the substrate. In some cases a combination of pigments is required to achieve a suitable match. For white paper, examples of typical opacifying pigments include, but are not limited to, titanium oxide or zinc oxide. For blue paper, examples of typical opacifying agents include, but are not limited to, iron oxides, ceramic pigments and iron blues. Other colors and shades of colors can be achieved by experimentation. The amount of opaque pigment used in the present invention is that amount suitable to prevent the ink from showing through. The masking layer and pressure sensitive adhesive layer optionally contain "filler" pigments. Examples of fillers include, but are not limited to, aluminum oxides and calcium carbonate.

The masking layer and pressure sensitive adhesive layer optionally contain inhibitors and antioxidants. One example of a suitable inhibitor is methylhydroquinone, and a suitable antioxidant is octadecyl-3-(3,5-di-tert-butyl-4-hydroxyphenyl)-propionate made by Ciba Specialty Chemicals, Tarrytown, N.Y. and sold under the trade name IRGANOX 1076.

The masking layer and pressure sensitive adhesive layer optionally contain tackifiers, wetting agents or dispersants. Suitable tackifiers include, but are not limited to, rosin ester, polyamides or an aromatic resin such as NORSOLENE S-135 made by Sartomer, Exton, Pa. The wetting agent is a surfactant, and a suitable wetting agent is FLOURAD FC-430 (a nonionic fluoroaliphatic polymeric ester made by 3M Specialty Chemicals Div., St. Paul, Minn.) An example of a suitable dispersant is DISPERBYK 180 (an alkylolammonium salt of a block copolymer with acidic groups made by BYK Chemie, Wesel, Germany).

The masking layer and pressure sensitive adhesive layer optionally contain bleed inhibitors. Suitable bleed inhibitors include, but are not limited to, polyvinyl amine or salts thereof, phosphatidyl choline (mixtures of diglycerides of fatty acids linked to the choline ester of phosphoric acid), tallow amines, and mixtures thereof.

Preferred bleed inhibitors include polyvinyl amine which includes vinylamine homopolymers of molecular formula $(C_2H_5N)_x$, where x represents an integer from 5 to 150. More preferred polyvinyl amines include polyvinyl amine (made by Polysciences, Warrington, Pa.). Another bleed inhibitor includes the complex combination of diglycerides of fatty acids linked to the choline ester of phosphoric acid. A preferred complex combination of diglycerides of fatty acids linked to the choline ester of phosphoric acid is lecithin. Other useful bleed inhibitors are tallow amines. Preferred tallow amines include N-tallow amines such as N-tallow alkyltrimethylenediamine oleates. Bleed inhibitors also include COLOROL STANDARD, COLOROL F and COLOROL 100 which are manufactured by Lucas Meyer, Freising, Germany. Mixtures of additives can also be used if desired.

Whether composed of one, two or more bleed inhibitors, the bleed inhibitor is present in the correction medium in an amount from about 0.1% to about 10%, preferably from about 0.5% to about 5% by weight and more preferably from about 1% to about 4% by weight, based on the total weight of the layer.

The dimensions of the invention are chosen to achieve a balance between masking properties and mechanical properties. The thickness of the masking layer can range from about 1 to about 100 μm, with a preferred thickness of about 25 μm. The thickness of the pressure sensitive adhesive layer can range from about 1 to about 30 μm, with a preferred thickness of about 5 μm. If the layers are too thin, then the masking properties or adhesive properties will not be sufficient for the correction tape to properly cover the ink. If the layers are too thick, then the pressure sensitive correction tape cannot be easily rolled into a correction tape dispenser, and a thick film will tend to be brittle. Moreover, the cost of the product is increased unnecessarily.

In a preferred embodiment of the invention a multilayer pressure sensitive correction tape comprises a release line, a masking layer which is radiation-cured, and a pressure sensitive adhesive layer which is radiation-cured, wherein the masking layer contains no volatile components when it is applied to the correction tape assembly.

In another preferred embodiment of the invention a multilayer pressure sensitive correction tape comprises a release line, a masking layer, and a pressure sensitive adhesive layer which is radiation-cured, wherein the pressure sensitive adhesive layer contains no volatile components when it is applied to the correction tape assembly.

In a more preferred embodiment of the invention a multilayer pressure sensitive correction tape comprises a release line, a masking layer which is radiation-cured, and a pressure sensitive adhesive layer which is radiation-cured, wherein neither of the layers contain volatile components when the layers are applied to the correction tape assembly.

Another embodiment of the invention comprises a process for the manufacture of multilayer pressure sensitive correction tape comprises a release liner, a masking layer on the release liner, or a pressure sensitive adhesive layer on the masking layer wherein at least one of the layers is cured with radiation after it is applied to the correction tape assembly.

In a most preferred embodiment of the invention a multilayer pressure sensitive correction tape comprises a transparent or translucent release liner, a masking layer which is radiation-cured by directing U.V. light at the both the coated side and uncoated side of the release liner, and a pressure sensitive adhesive layer which is radiation-cured, wherein the formulations for the layers contain reactive monomers and, optionally oligomers, which are cured on the correction tape assembly, and none of the layers contains volatile components when the layers are applied to the correction tape assembly.

EXAMPLES

Certain embodiments and features of the invention are now illustrated, but not limited to the following examples.

Example 1

RADIATION-CURABLE MASKING LAYER FORMULATION

In a typical preparation of the present invention (formulation A in Table 1), N-vinyl pyrrolidone (315 g), SR-256 (657 g), CN966J90 (225 g) SR-545 (171 g) FC430 (90 g) and DISPERBYK 180 (225 g) were added to a mixing vessel. The contents of the vessel were mixed at 40° C. for 10 minutes. The mixing speed was increased, and talc (135 g), R931 (3870 g), R900 (1710 g) and Calcilit IG (1134 g) were slowly added to the vessel. The contents of the vessel were mixed at 40° C. for 30 minutes. ESACURE KTO46 (450 g) was added to the vessel, and the contents of the vessel were mixed at high speed at 40° C. for 30 minutes.

Examples of two radiation-curable masking layer formulations of the present invention are shown in Table 1.

TABLE 1

| COMPONENTS | A, wt. % | B, wt. % |
|---|---|---|
| N-Vinyl Pyrolidone[1] | 3.5 | — |
| SR-256[2] | 7.5 | 11 |
| CN966J90[3] | 2.5 | 2.5 |
| SR 454[4] | 1.9 | 1.9 |
| FLOURAD FC 430[5] | 1 | 1.3 |
| DISPERBYK 180[6] | 2.5 | 2.5 |
| Talc[7] | 1.5 | 4.6 |
| DuPont R931[8] | 43 | 40.2 |
| DuPont R900[9] | 19 | 19 |
| Calcilit 1G[10] | 12.6 | 12 |
| ESACURE KTO46[11] | 5 | 5 |

[1]made by ISP, Wayne, NJ.
[2]made by Sartomer, Exton, PA. SR-256 is 2(2-ethoxyethoxy)-ethyl acrylate.
[3]made by Sartomer, Exton, PA. CN966J90 is an aliphatic polyester based urethane diacrylate oligomer blended with 19% SR-256.
[4]made by Sartomer, Exton, PA. SR-454 is ethoxylated (3) trimethylolpropane triacrylate.
[5]made by 3M Corp., St. Paul, MN. FLOURAD FC 430 is a nonionic fluoroaliphatic polymeric ester.
[6]made by BYK Chemie, Wesel, Germany. DISPERBYK 180 is an alkylolammonium salt of a block copolymer with acidic groups.
[7]available from chemical suppliers such as Aldrich Chemical, Milwaukee, WI.
[8]made by Dupont Corp., Wilmington, DE. DuPont R931 is a dry powder containing 80 wt. % titanium dioxide, 6.4 wt. % alumina and 10.2 wt. % silica.
[9]made by Dupont Corp., Wilmington, DE. DuPont R900 is a fine dry powder containing 94 wt. % titanium dioxide and 4.5 wt. % alumina.
[10]made by Alpha Calcilit Fullstoff GMBH, KG, Koln, Germany. Calcilit 1G is fine particle size calcium carbonate.
[11]made by Sartomer, Exton, PA. ESACURE KTO46 is a blend of 2,4,6-trimethylbenzoyldiphenylphosphine oxide, alpha-hydroxy ketone and a benzophenone derivative.

Example 2

RADIATION-CURABLE PRESSURE SENSITIVE ADHESIVE LAYER FORMULATION

Two examples of radiation-curable pressure sensitive adhesive formulations of the present invention are shown in Table 2.

TABLE 2

| COMPONENTS | C, wt. % | D, wt. % |
|---|---|---|
| EPOTUF 9200[1] | 6 | 6 |
| CN973H85[2] | 22 | 22 |
| SR-395[3] | 52 | 62 |
| methylhydroquinone, 99%[4] | 0.04 | 0.04 |
| IRGANOX 1076[5] | 0.1 | 0.1 |
| NORSOLENE S-135[6] | 10 | — |
| ESACURE KTO46[7] | 9.86 | 9.86 |

[1]made by Reichold, Research Triangle, NC. EPOTUF 9200 is an amine acrylate monomer.
[2]made by Sartomer, Exton, PA. CN973H85 is an aromatic urethane oligomer.
[3]made by Sartomer, Exton, PA. SR-395 is isodecyl acrylate monomer.
[4]available from chemical suppliers such as Aldrich Chemical, Milwaukee, WI.
[5]made by Ciba Specialty Chemicals, Tarrytown, NY. IRGANOX 1076 is octadecyl-3-(3,5-di-tert-butyl-4-hydroxyphenyl)-propionate.
[6]made by Sartomer, Exton, PA. NORSOLENE S-135 is an aromatic resin which is used as a tackifier.
[7]made by Sartomer, Exton, PA. ESACURE KTO46 is a blend of 2,4,6-trimethylbenzoyldiphenylphosphine oxide, alpha-hydroxy ketone and a benzophenone derivative.

Example 3

A multilayer pressure sensitive correction tape having a combination of a U.V.-cured masking layer and a U.V.-cured pressure sensitive adhesive layer was prepared in a continuous process in combination with a roll of release liner. A roll of 1 mil silicone-coated polyester release liner was placed into a gravure coating machine. The release liner was C/1S/4750 Matte Silicone Release; C/O/S 8002, sold under the trade name SUPRALINER by Furon, Worcester, Mass. The liner was moved at a rate of about 50 feet/min, and a predetermined thickness of each layer was applied to one side of the release liner. After each application, the coated release liner was cured by a 300 watt/linear inch U.V. lamp using V-Lamp bulbs manufactures by Fusion Systems, Gaithersburg, Md. The U.V. lamp was directed to the coated side of the release liner. After curing, the release liner was taken up into the windup roll of the coating machine.

A masking layer formulation, such as A or B in Table 1, was applied to one side of the release liner to a thickness of about 25 μm. The release film were then cured by directing U.V. radiation at the coated side of the pressure sensitive release tape. The thickness of the U.V.-cured masking layer was 25 μm (±10%).

A pressure sensitive adhesive layer formulation, such as C or D in Table 2, was applied on top of the U.V.-cured masking layer to a thickness of about 6 μm. The pressure sensitive adhesive layer was then cured by directing U.V. radiation at the coated side of the pressure sensitive release tape. The thickness of the U.V.-cured pressure sensitive adhesive layer was 6 μm (±+10%).

All patents cited in the foregoing text are expressly incorporated herein by reference in their entirety.

It will understood that the claims are intended to cover all changes and modifications of the preferred embodiments of the invention, herein chosen for the purpose of illustration, which do not constitute a departure from the spirit and scope of the invention.

What is claimed is:

1. A multilayer pressure sensitive correction tape comprising:
    (A) a release liner,
    (B) a masking layer on the release liner, and
    (C) a pressure sensitive adhesive layer on the masking layer, wherein the masking layer and/or pressure sensitive adhesive layer is radiation cured.

2. The multilayer pressure sensitive correction tape of claim 1, wherein the masking layer and the pressure sensitive adhesive layer are radiation cured.

3. The multilayer pressure sensitive correction tape of claim 1, wherein the masking layer is applied to the release liner followed by curing with radiation to form a radiation cured masking layer.

4. The multilayer pressure sensitive correction tape of claim 1, wherein the layer cured by radiation further comprises a reactive monomer.

5. The multilayer pressure sensitive correction tape of claim 4, further comprising a photoinitiator.

6. The multilayer pressure sensitive correction tape of claim 4, wherein the reactive monomer is selected from the group consisting of vinyl, acrylate, methacrylate, vinyl ether, and epoxy.

7. The multilayer pressure sensitive correction tape of claim 4, wherein the reactive monomer comprises acrylate or methacrylate.

8. The multilayer pressure sensitive correction tape of claim 5, wherein the photoinitiator is selected from the group consisting of benzoin alkyl ether, benzophenone, benzildimethyl ketal or a blend of 2,4,6-trimethylbenzoyldiphenylphosphine oxide, alpha hydroxy ketone and a benzophenone derivative.

9. The multilayer pressure sensitive correction tape of claim 1, wherein the layer cured by radiation further comprises a reactive oligomer.

10. The multilayer pressure sensitive correction tape of claim 9, further comprising a photoinitiator.

11. The multilayer pressure sensitive correction tape of claim 9, wherein the reactive oligomer is selected from the group consisting of vinyl, acrylate, methacrylate, vinyl ether, and epoxy.

12. The multilayer pressure sensitive correction tape of claim 10, wherein the photoinitiator is selected from the group consisting of benzoin alkyl ether, benzophenone, benzildimethyl ketal or a blend of 2,4,6 trimethylbenzoyl-diphenylphosphine oxide, alpha hydroxy ketone and a benzophenone derivative.

13. The multilayer pressure sensitive correction tape of claim 1, wherein the masking layer further comprises an opaque pigment.

14. The multilayer pressure sensitive correction tape of claim 13, wherein the opaque pigment is an inorganic pigment whose color matches the background of a substrate on which the correction tape is applied.

15. The multilayer pressure sensitive correction tape of claim 14, wherein the opaque pigment is selected from titanium dioxide or zinc oxide.

16. The multilayer pressure sensitive correction tape of claim 1, wherein the pressure sensitive adhesive layer further comprises an opaque pigment.

17. The multilayer pressure sensitive correction tape of claim 16, wherein the opaque pigment is an inorganic pigment whose color matches the background of a substrate on which the correction tape is applied.

18. The multilayer pressure sensitive correction tape of claim 17, wherein the opaque pigment is selected from titanium dioxide or zinc oxide.

19. The multilayer pressure sensitive correction tape of claim 1, wherein at least one of the layers comprises an inhibitor.

20. The multilayer pressure sensitive correction tape of claim 19, wherein the inhibitor is methylhydroquinone.

21. The multilayer pressure sensitive correction tape of claim 1, wherein at least one of the layers comprises an antioxidant.

22. The multilayer pressure sensitive correction tape of claim 21, wherein the antioxidant is octadecyl-3-(3,5 di-tert-butyl-4-hydroxyphenyl) propionate.

23. The multilayer pressure sensitive correction tape of claim 1, wherein at least one of the layers comprises a tackifier.

24. The multilayer pressure sensitive correction tape of claim 23, wherein the tackifier is selected from the group consisting of a rosin ester and an aromatic resin.

25. The multilayer pressure sensitive correction tape of claim 1, wherein the masking layer or pressure sensitive adhesive layer further comprises at least one of a filler, wetting agent, or bleed inhibitor.

26. The multilayer pressure sensitive correction tape of claim 25, wherein the filler is calcium carbonate or aluminum oxide.

27. The multilayer pressure sensitive correction tape of claim 25, wherein the wetting agent is a nonionic fluoroaliphatic polymeric ester.

28. The multilayer pressure sensitive correction tape of claim 25, wherein the bleed inhibitor is selected from the group consisting of polyvinyl amine, lecithin and N tallow amines.

29. The multilayer pressure sensitive correction tape of claim 1, wherein the thickness of the cured masking layer is from about 1 to about 100 $\mu$m.

30. The multilayer pressure sensitive correction tape of claim 29, wherein the thickness of the cured masking layer is about 25 $\mu$m.

31. The multilayer pressure sensitive correction tape of claim 1, wherein the thickness of the cured pressure sensitive adhesive layer is from about 1 to about 30 $\mu$m.

32. The multilayer pressure sensitive correction tape of claim 31, wherein the thickness of the cured pressure sensitive adhesive layer is about 5 $\mu$m.

33. The multilayer pressure sensitive correction tape of claim 1, wherein the radiation is ionizing radiation.

34. The multilayer pressure sensitive correction tape of claim 33, wherein the ionizing radiation is selected from the group consisting of electron beam radiation, gamma ray radiation and ultraviolet radiation.

35. The multilayer pressure sensitive correction tape of claim 1, wherein at least one of the two layers does not contain volatile components when it is applied to form the correction tape.

36. The multilayer pressure sensitive correction tape of claim 1, wherein at least one of the two layers is applied as a hot melt.

37. The multilayer pressure sensitive correction tape of claim 36, wherein the masking layer is applied as a hot melt to form the correction tape followed by curing.

38. The multilayer pressure sensitive correction tape of claim 36, wherein the pressure sensitive adhesive layer is applied as a hot melt to form the correction tape followed by curing.

39. The multilayer pressure sensitive correction tape of claim 36, wherein the masking layer and the pressure sensitive adhesive layer are applied as hot melts to form the correction tape followed by curing.

40. The multilayer pressure sensitive correction tape of claim 1, wherein the masking layer and pressure sensitive adhesive layer have viscosities ranging from about 1 to about 1,000,000 cps when said layers are applied to form the correction tape.

41. The multilayer pressure sensitive correction tape of claim 40, wherein the masking layer and multilayer pressure sensitive adhesive layer have viscosities ranging from about 100 to about 100,000 cps when said layers are applied to form the correction tape.

42. The multilayer pressure sensitive correction tape of claim 1 wherein;
the release liner is transparent or translucent;
the masking layer is applied to one side of the release line to form a coated side and an uncoated side of the release liner; and
the masking layer is cured by directing radiation to the coated side of the release liner and to the uncoated side of the release liner.

43. The multilayer pressure sensitive correction tape of claim 1, wherein the radiation cured layers have essentially no solubility in organic solvents or water.

44. A multilayer pressure sensitive correction tape comprising:
  (A) a release liner;
  (B) a masking layer on the release liner; and
  (C) a pressure sensitive adhesive layer on the masking layer; wherein:
    (i) the masking layer and the pressure sensitive adhesive layer contain reactive monomers when they are applied to form the correction tape;
    (ii) the masking layer and the pressure sensitive adhesive layer contain no volatile components when they are applied to form the correction tape;
    (iii) the masking layer is radiation cured after it is applied to the release liner; and
    (iv) the pressure sensitive layer is radiation cured after it is applied to the masking layer.

45. The multilayer pressure sensitive correction tape of claim 4, wherein the reactive monomers comprise acrylate or methacrylate.

46. A process for the manufacture of a multilayer pressure sensitive correction tape comprising:
  (A) providing a release liner,
  (B) providing a masking layer on the release liner, and
  (C) providing a pressure sensitive adhesive layer on the masking layer, wherein the masking layer or pressure sensitive adhesive layer is cured by radiation.

47. The process of claim 46, wherein the layer that is cured contains reactive monomer when the layer is applied to the correction tape, wherein the reactive monomer comprises acrylate or methacrylate.

* * * * *